(12) United States Patent
Bennauer et al.

(10) Patent No.: US 8,678,034 B2
(45) Date of Patent: Mar. 25, 2014

(54) SPACE-SAVING QUICK ACTING CONTROL VALVE FOR A STEAM TURBINE

(75) Inventors: Martin Bennauer, Bottrop (DE); Ningsih Flohr, Mülheim an der Ruhr (DE); Michael Nienhaus, Borken (DE); Christoph Schindler, Essen (DE); Dirk Weltersbach, Bochum (DE)

(73) Assignee: Siemens Aktiengesellschaft, Munich (DE)

( * ) Notice: Subject to any disclaimer, the term of this patent is extended or adjusted under 35 U.S.C. 154(b) by 134 days.

(21) Appl. No.: 13/256,228

(22) PCT Filed: Mar. 8, 2010

(86) PCT No.: PCT/EP2010/052878
§ 371 (c)(1),
(2), (4) Date: Nov. 21, 2011

(87) PCT Pub. No.: WO2010/105928
PCT Pub. Date: Sep. 23, 2010

(65) Prior Publication Data
US 2012/0056114 A1   Mar. 8, 2012

(30) Foreign Application Priority Data
Mar. 16, 2009  (EP) .................................... 09003788

(51) Int. Cl.
*F16K 11/20*   (2006.01)
(52) U.S. Cl.
USPC .................... 137/637.2; 137/630; 137/630.16

(58) Field of Classification Search
USPC .................. 137/613, 614.13, 614.18, 625.14, 137/625.39, 628, 630.16, 630, 637.2, 637
See application file for complete search history.

(56) References Cited

U.S. PATENT DOCUMENTS

| | | | | |
|---|---|---|---|---|
| 1,077,503 A | * | 11/1913 | Anderson | 251/30.03 |
| 1,166,884 A | * | 1/1916 | Bergo | 137/637.2 |
| 2,392,741 A | * | 1/1946 | Hurlburt | 137/630.22 |
| 3,529,630 A | * | 9/1970 | Podolsky | 137/630.13 |
| 5,971,018 A | * | 10/1999 | Karlsson et al. | 137/613 |
| 2009/0008594 A1 | | 1/2009 | Burmester | |

FOREIGN PATENT DOCUMENTS

| | | |
|---|---|---|
| CN | 1488840 A | 4/2004 |
| CN | 101297101 A | 10/2008 |
| DE | 1916876 A1 | 11/1969 |
| DE | 102007027464 A1 | 12/2008 |

* cited by examiner

*Primary Examiner* — John K Fristoe, Jr.
*Assistant Examiner* — R. K. Arundale

(57) ABSTRACT

A quick acting control valve for a steam turbine is provided. The quick acting control valve includes a valve box and a control valve cone which is arranged in the valve box so as to be displaceable along its center axis, whereby the control valve cone may be brought into an open position in which the control valve cone, with its control valve cone surface is lifted off the valve box and into a closed position in which the control valve cone rests against the valve box with its control valve cone surface, and a quick acting valve piston which is arranged in the valve box so as to face the back of the control valve cone facing away from the control valve cone surface, the quick acting control valve piston, on its outer peripheral edge, always resting on the valve box in a steam-tight manner.

8 Claims, 2 Drawing Sheets

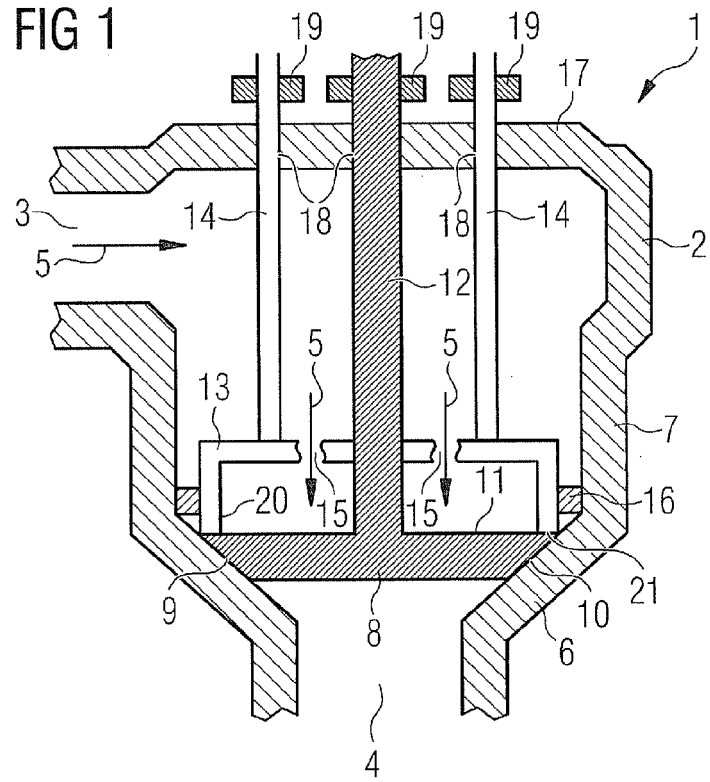
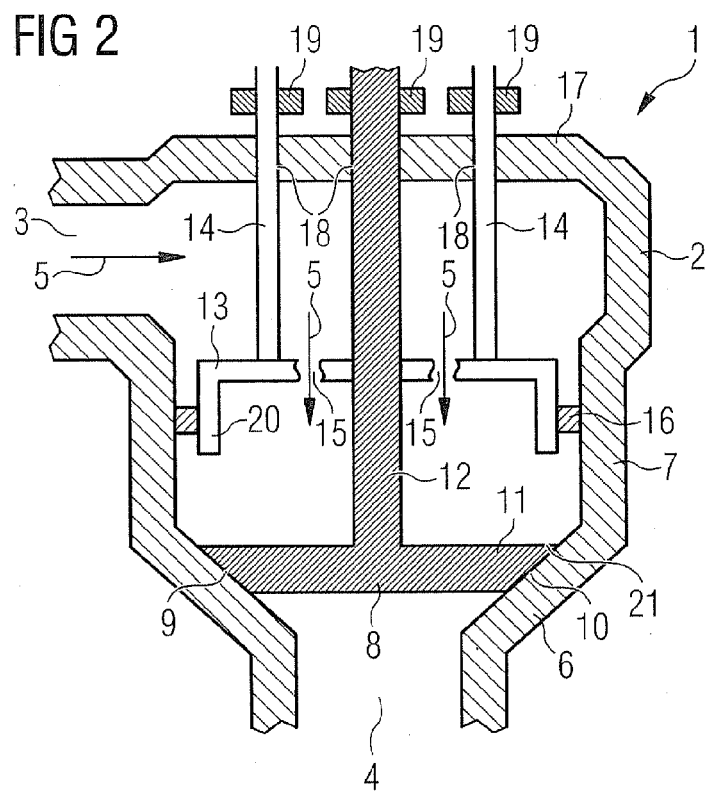

SPACE-SAVING QUICK ACTING CONTROL VALVE FOR A STEAM TURBINE

CROSS REFERENCE TO RELATED APPLICATIONS

This application is the US National Stage of International Application No. PCT/EP2010/052878, filed Mar. 8, 2010 and claims the benefit thereof. The International Application claims the benefits of European Patent Office application No. 09003788. EP filed Mar. 16, 2009. All of the applications are incorporated by reference herein in their entirety.

FIELD OF INVENTION

The invention relates to a quick acting control valve for a steam turbine, a control valve and a quick acting valve being combined together in the quick acting control valve.

BACKGROUND OF INVENTION

A steam turbine, which is used, for example, in a steam power station, has, on the live steam side, a shut-off provided by a quick acting valve and a control valve provided for controlling the supply of live steam to the steam turbine for the safe operation of the steam turbine. The control valve and the quick acting valve are installed one behind the other, each in a separate valve box. For safety reasons, the quick acting capability provided by the control valve and the quick acting valve is redundant. The control valve and the quick acting valve each have their own laminated cup springs, which, in the event of a fault, lead to the valves being closed quickly. Conventionally, the quick acting valve and the control valve are designed as series-connected lifting valves, one of the lifting valves exerting the quick acting function and the controlling of the live steam mass flow being accomplished by the other lifting valve. The lifting valves are constructed, for example, as single-seat valves which are advantageous on account of their good tightness and their low pressure loss. However, traditionally the lifting valves are designed with a large, heavy box, resulting in a greater use of materials. This leads to more time and money spent on production with higher costs. In addition, the traditional lifting valves require a large amount of space which means that the volume of pipework on the live steam side of the steam turbine housing is reduced in a corresponding manner.

SUMMARY OF INVENTION

It is the object of the invention to create a quick acting control valve for a steam turbine, the design of the quick acting control valve being compact, saving on material and cost-efficient.

The quick acting control valve as claimed in the invention for a steam turbine has a valve box and a control valve cone, which is arranged in the valve box so as to be displaceable along its center axis, as a result of which the control valve cone can be moved into an open position in which the control valve cone, with its control valve cone surface, is lifted off the valve box, and into a closed position in which the control valve cone abuts against the valve box with its control valve cone surface, and having a quick acting valve piston, which is arranged in the valve box facing the back of the control valve cone remote from the control valve cone surface and, on its outer peripheral edge, always abuts against the valve box in a steam-tight manner and has a passage, through which steam can pass from the side of the quick acting valve piston remote from the control valve cone to the side of the quick acting valve piston facing the control valve cone, the quick acting valve piston being arranged in the valve box so as to be displaceable in parallel with the center axis of the control valve cone and being thereby able to be placed against the back of the control valve cone, as a result of which the passage is impassable for the steam.

Consequently, a control valve and a quick acting valve are installed in a combined manner in the one-piece valve in the quick acting control valve as claimed in the invention, the control valve by way of the control valve cone and the quick acting valve by way of the quick acting valve piston having a common valve seat. The steam mass flow at the valve box can be shut-off by way of the control valve cone, whilst the steam mass flow at the control valve cone can be shut-off by way of the quick acting valve piston. Combining the control valve and the quick acting valve together in the quick acting control valve as claimed in the invention provides the quick acting valve with a space saving arrangement. This reduces the volume of the valve box compared to the traditional valve boxes for a traditional control valve and a traditional quick acting valve, as a result of which the use of material and finally the production costs for the quick acting control valve as claimed in the invention are reduced.

The valve box preferably has a steam inlet opening, which is arranged facing the quick acting valve piston, and a steam outlet opening, which is arranged facing the control valve cone. In a preferred manner, the valve box has a conical box section, with which the control valve cone with its control valve cone surface forms a control valve seat, and a cylindrical box section by which the quick acting valve piston is guided. This means that the mass flow of the steam at the control valve cone seat can be both controlled and shut-off with a quick action by way of the control valve cone.

In a preferred manner, the quick acting valve piston has a piston ring, which abuts against the cylindrical box section in a sliding manner. This means that the quick acting valve piston with the piston ring is guided in a secure and tight manner at the cylindrical box section. In addition, the quick acting valve piston, on its outer peripheral edge, preferably has a circumferential projection which faces the back of the control valve cone and by way of which the quick acting valve piston can be placed against the back of the control valve cone such that the passage is impassable for the steam. Consequently, through the abutting of the quick acting valve piston against the back of the control valve cone by way of its projection, the quick acting function can be accomplished when, at the same time, the control valve cone abuts with its control valve cone surface against the control valve seat.

It is preferred that the center axis of the control valve cone and the center axis of the quick acting valve piston coincide. This means that the quick acting control valve as claimed in the invention has an axially symmetrical design which is space saving.

In addition, the control valve cone has a control valve spindle and the quick acting valve piston has at least one quick acting valve spindle, wherein the spindles are longitudinally displaceable in parallel with the center axes. The control valve spindle is preferably mounted on the back of the control valve cone and is arranged so as to be guided through the quick acting valve piston.

The valve box preferably has a box wall section which has a spindle guide hole in each case for the control valve spindle and for the quick acting valve spindle, the corresponding spindle being guided through said spindle guide hole. In this case, each spindle is preferably provided with a laminated cup spring outside the box wall section for actuating the respective spindle.

BRIEF DESCRIPTION OF THE DRAWINGS

A preferred embodiment of the quick acting control valve as claimed in the invention is explained below by way of the attached schematic drawings, in which:

FIG. 1 shows the embodiment of the quick acting control valve as claimed in the invention, the control valve and the quick acting valve being closed, FIG. 2 shows the embodiment shown in FIG. 1, the control valve being closed and the quick acting valve open.

DETAILED DESCRIPTION OF INVENTION

Figure 3:
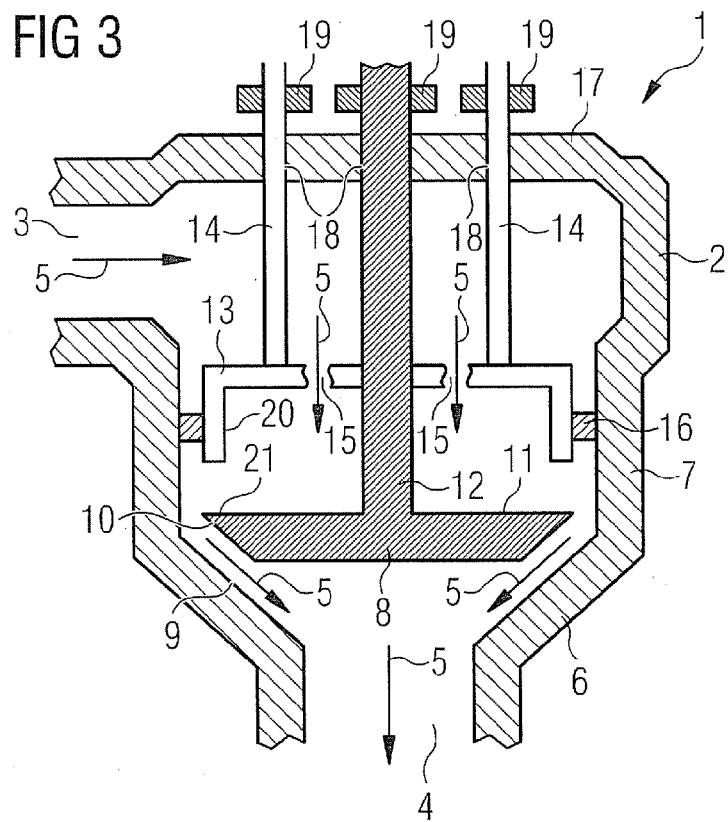
FIG. 3 shows the embodiment shown in FIG. 1, both the control valve and the quick acting valve being open

As can be seen from FIGS. 1 to 4, a quick acting control valve 1 has a valve box 2 in which a steam inlet opening 3 and a steam outlet opening 4 are provided. The quick acting control valve 1 is to be installed with the steam outlet opening 4 on a live steam connector of the steam turbine, a live steam line of a live steam rail having to be connected to the steam inlet opening 3. Live steam enters the quick acting control valve 1 through the steam inlet opening 3 and is discharged to the steam turbine through the steam outlet opening 4 such that a steam flow 5 is formed in the quick acting control valve 1. In FIGS. 1 to 4, the steam inlet opening 3 is arranged in the valve box 2 extending in a horizontal manner such that the steam flow 5 extends horizontally in the region of the steam inlet opening 3. When flowing through the quick acting control valve 1, the steam passes through a cylindrical box section 7 and after this a conical box section 6 and then exits from the valve box 2 through the steam outlet opening 4. In FIGS. 1 to 4, the steam outlet opening 4 is arranged in the valve box 2 extending vertically downward such that the steam flow 5 extends vertically in the region of the steam outlet opening 4.

In the valve box 2 there is a control valve cone 8 which has a control valve cone surface 10, which faces the steam outlet opening 4 and by way of which the control valve cone 8 forms a control valve seat 9 on the conical box section 6. The control valve cone 8 is arranged in the valve box 2 such that, in FIGS. 1 to 4, the center axis of the control valve cone 8 extends vertically. Remote from the control valve surface 10, the control valve cone 8 has a back 11 of the control valve cone. In addition, the control valve cone 8 has a control valve spindle 12, which is secured lying on the center axis of the control valve cone 8 and with its end face centrally on the back 11 of the control valve cone. A box wall section 17 of the valve box 2 is provided facing the back 11 of the control valve cone, said box wall section extending substantially in parallel with the back 11 of the control valve cone. In the box wall section 17 there is provided a spindle guide hole 18, through which the control valve spindle 12 extends and is guided so as to be displaceable along the center axis of the control valve cone 8. Outside the valve box 2 on the box wall section 17, a laminated cup spring 19 is attached to the control valve spindle 12 for actuating the control valve spindle 12.

The control valve cone 8 is arranged in the valve box 2 so as to be longitudinally displaceable along its center axis, it being possible to displace the control valve cone 8 by applying a displacement force onto the control valve spindle 12, for example from outside the valve box 2. This means that the control valve cone surface 10 can be arranged so as to be placed against or lifted off the conical box section 6, as a result of which, with the control valve cone 8 actuated in a corresponding manner, the function of a control valve can be exerted with the quick acting control valve 1.

In addition, the quick acting control valve 1 has a quick acting valve piston 13, which is arranged in the cylindrical box section 7 facing the back 11 of the control valve cone. Two quick acting valve spindles 14 are attached to the quick acting valve piston 13, extend in parallel with the center axis of the control valve cone 8 and are mounted in the box wall section 17 so as to be longitudinally displaceable in each case through a further spindle guide hole 18. A piston ring 16 is attached on the outer peripheral edge of the quick acting valve piston 13, said piston ring being provided between the quick acting valve piston 13 and the cylindrical box section 7 and sealing in a steam-tight manner in each position of the quick acting valve piston 13. The quick acting valve piston 13 is arranged in parallel with the center axis of the control valve cone 8 and is arranged so as to be actuatable via the quick acting valve spindles 14, the piston ring 16 sliding on the cylindrical box section 7 when the quick acting valve piston 13 is displaced.

The quick acting valve piston 13 has a circumferential projection 20 on its outer peripheral edge, said projection extending vertically in the direction of the back 11 of the control valve cone and being able to be placed in a steam-tight manner against the back 11 of the control valve cone thus forming a quick acting valve seat 21. In addition, the quick acting valve piston 13 has two passages 15, through which steam can flow from the side of the quick acting valve piston 13 which is remote from the back 11 of the control valve cone, to the side of the quick acting valve piston 13 which is facing the back 11 of the control valve cone.

Figure 4:
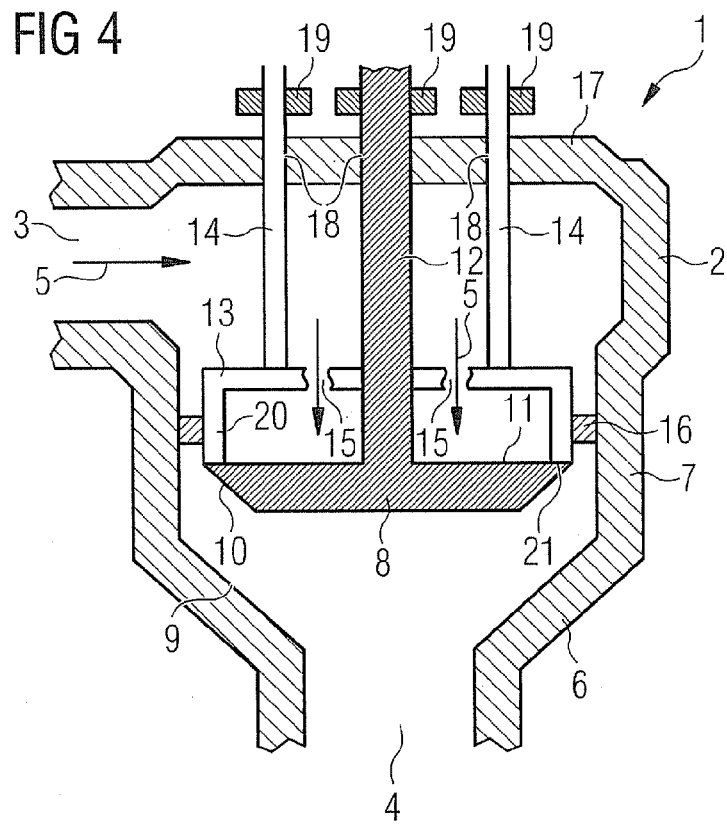
FIG. 4 shows the embodiment shown in FIG. 1, the control valve being open and the quick acting valve closed.

In FIGS. 1 and 2, the control valve cone 8, with its control valve cone surface 10, is placed against the conical box section 6 in the quick acting control valve 1 such that the control valve seat 9 is not passable for steam. In FIG. 3, the control valve cone 8 is lifted off the conical box section 6 such that steam is passable at the control valve seat 9, the passing steam mass flow being defined by the spacing between the control valve cone 8 and the conical box section 6. In FIG. 4, the control valve cone 8 is lifted further off the conical box section 6 such that a greater steam mass flow would be passable at the control valve seat 9, compared to the steam mass flow which is passable in the quick acting control valve 1 in FIG. 3, when the quick acting valve piston 13 is arranged lifted off the control valve cone 8.

In FIGS. 2 and 3, the quick acting valve piston 13 is arranged lifted off the control valve cone 8, the quick acting valve piston 13 abutting in a steam-tight manner against the cylindrical box section 7 with the piston ring 16. Steam is able to flow through the passages 15 into an intermediate space between the quick acting valve piston 13 and the control valve cone 8. By the projection 20 not abutting against the back 11 of the control valve cone in FIGS. 2 and 3, the quick acting valve seat 21 is passable for steam. However, in FIG. 2, the control valve cone 8 abuts against the conical box section 6 with its control valve cone surface 10 such that the control valve seat 9 is closed. This means that the steam flow 5 can indeed pass the quick acting valve piston 13 through the passages 15 and via the quick acting valve seat 21 can arrive at the control valve seat 9, by which, as shown in FIG. 2, the quick acting control valve 1 is closed.

As shown in FIGS. 1 and 4, the quick acting valve piston 13 abuts with its projection 20 against the back 11 of the control valve cone such that the quick acting valve seat 21 is impassable for steam. In FIGS. 1 and 4 the steam flow 5 can indeed pass through the passage 15 into the intermediate space between the quick acting valve piston 13 and the control valve cone 8, but is prevented from flowing further via the quick acting valve seat 21 towards the steam outlet opening 4. This means that the quick acting function of the quick acting control valve 1 is achieved.

In the normal mode of the quick acting control valve 1, the quick acting valve piston 13 is arranged lifted off the control valve cone 8 such that the steam flow 5 can pass via the quick acting valve seat 21 through the passages 15 to the control valve seat 9. The mass flow of the steam flow 5 is controllable at the control valve seat 9 by way of the position of the control valve cone 8 with reference to the conical box section 6. If the quick acting control valve 1 is brought into emergency shutdown, the quick acting valve piston 13, with its projection 20, is placed against the back 11 of the control valve cone via the quick acting valve spindles 14 such that the quick acting valve seat 21 is impassable for the steam flow 5. This prevents a through-flow from the steam inlet opening 3 to the steam outlet opening 4, regardless of which control position the control valve cone 8 is in. Consequently, a quick closing of the quick acting control valve 1 is achieved without the position of the control valve cone 8 needing to be modified.

The invention claimed is:

1. A quick acting control valve for a steam turbine, comprising:
    a valve box;
    a control valve cone; and
    a quick acting valve piston,
    wherein the control valve cone is arranged in the valve box so as to be displaceable along a first center axis of the control valve cone, as a result of which the control valve cone may be moved into an open position in which the control valve cone, with a control valve cone surface, is lifted off the valve box, and into a closed position in which the control valve cone abuts against the valve box with the control valve cone surface,
    wherein the quick acting valve piston is arranged in the valve box facing a back of the control valve cone remote from the control valve cone surface and, on an outer peripheral edge of the quick acting valve piston, always abuts against the valve box in a steam-tight manner and includes a passage, through which steam may pass from a side of the quick acting valve piston remote from the control valve cone to the side of the quick acting valve piston facing the control valve cone,
    wherein the quick acting valve piston is arranged in the valve box so as to be displaceable in parallel with the first center axis of the control valve cone and is thereby able to be placed against the back of the control valve cone, as a result of which a through-flow of steam from the steam inlet opening to the steam outlet opening is prevented
    wherein the first center axis of the control valve cone and a second center axis of the quick acting valve piston coincide, and
    wherein the control valve cone includes a control valve spindle and the quick acting valve piston includes a quick acting valve spindle, and
    wherein the spindles are longitudinally displaceable in parallel with the first center axis and the second center axis.

2. The quick acting control valve as claimed in claim 1, wherein the valve box includes a steam inlet opening, which is arranged facing the quick acting valve piston, and a steam outlet opening which is arranged facing the control valve cone.

3. The quick acting control valve as claimed in claim 1,
    wherein the valve box includes a conical box section, with which the control valve cone with the control valve cone surface forms a control valve seat, and
    wherein the valve box includes a cylindrical box section by which the quick acting valve piston is guided.

4. The quick acting control valve as claimed in claim 3, wherein the quick acting valve piston includes a piston ring, which abuts against the cylindrical box section in a sliding manner.

5. The quick acting control valve as claimed in claim 1, wherein the quick acting valve piston, on the outer peripheral edge, includes a circumferential projection which faces the back of the control valve cone and by way of which the quick acting valve piston may be placed against the back of the control valve cone such that the passage is impassable for the steam.

6. The quick acting control valve as claimed in claim 1, wherein the control valve spindle is mounted on the back of the control valve cone and is arranged so as to be guided through the quick acting valve piston.

7. The quick acting control valve as claimed in claim 6, wherein the valve box includes a box wall section which includes a spindle guide hole in each case for the control valve spindle and for the quick acting valve spindle, the corresponding spindle is guided through the spindle guide hole.

8. The quick acting control valve as claimed in claim 7, wherein each spindle is provided with a laminated cup spring outside the box wall section for actuating the respective spindle.

* * * * *